Nov. 23, 1954 P. S. BALDWIN 2,694,902
MASTER CYLINDER FOR HYDRAULIC SYSTEMS
Filed May 1, 1950 4 Sheets-Sheet 1
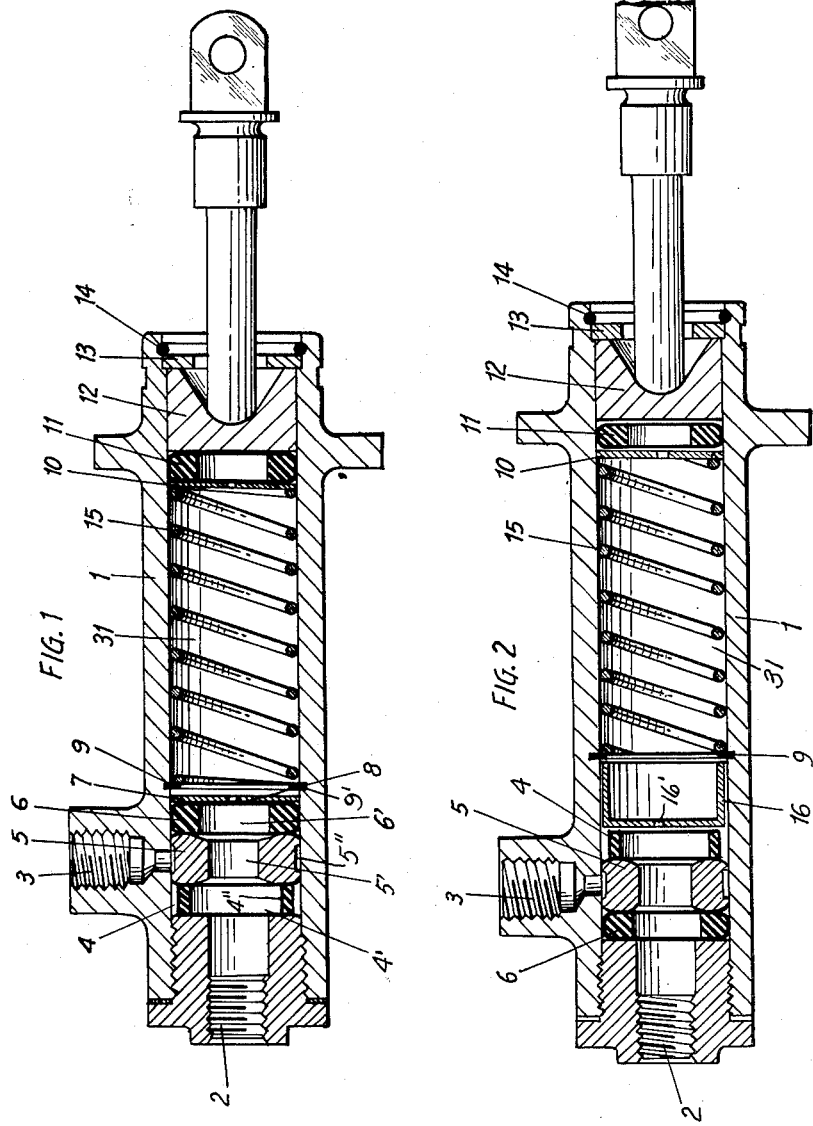
INVENTOR.
PHILIP S. BALDWIN
BY
ATTORNEY

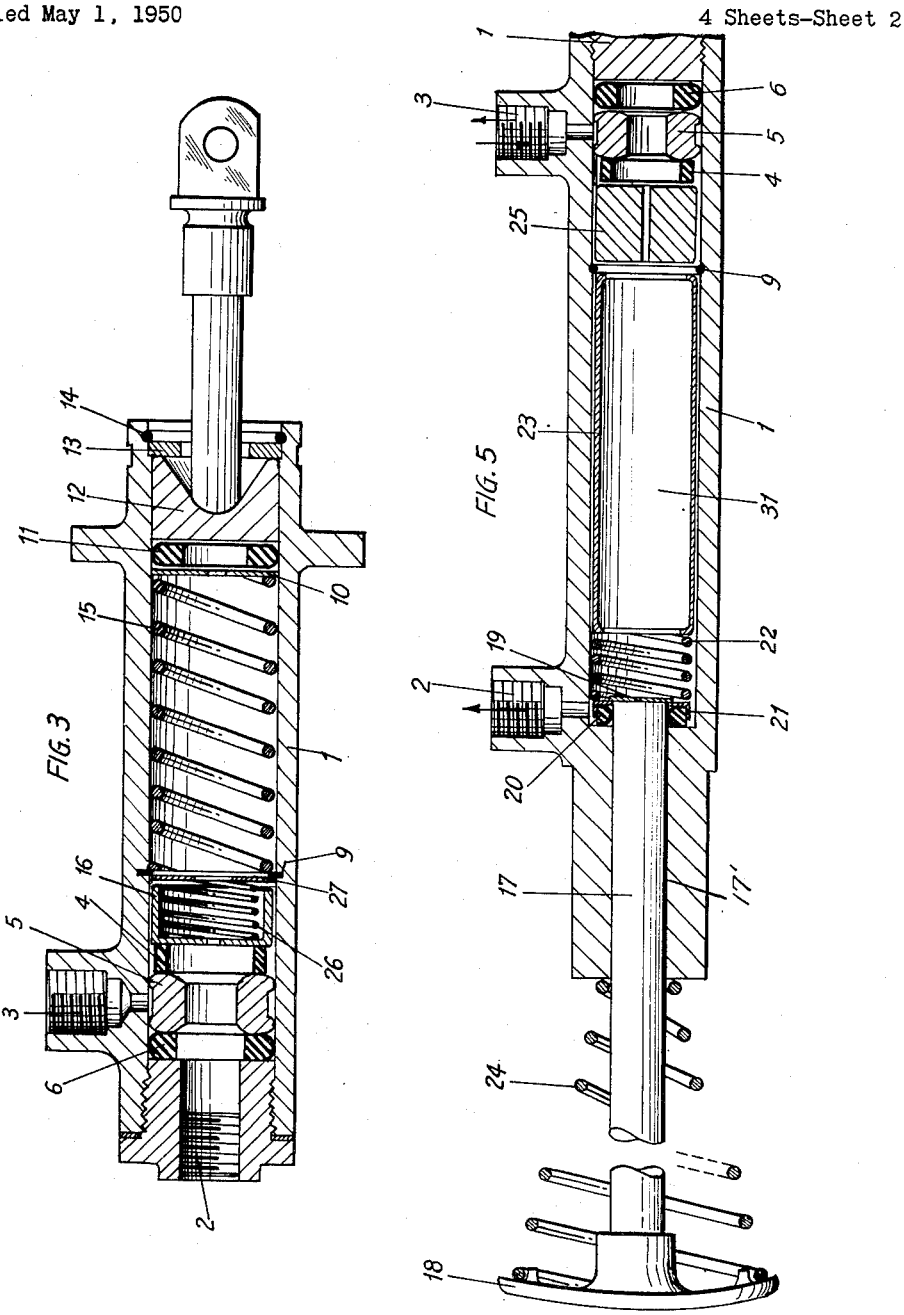

Nov. 23, 1954     P. S. BALDWIN     2,694,902
MASTER CYLINDER FOR HYDRAULIC SYSTEMS
Filed May 1, 1950     4 Sheets-Sheet 3
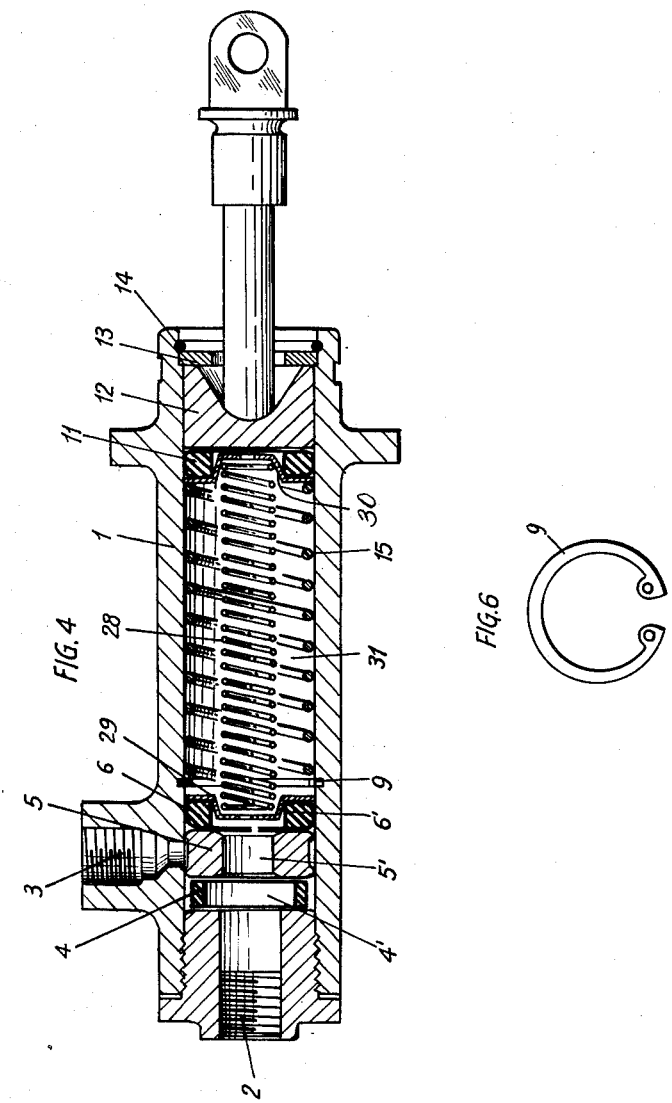
INVENTOR.
PHILIP S. BALDWIN
BY
ATTORNEY Nov. 23, 1954      P. S. BALDWIN      2,694,902
MASTER CYLINDER FOR HYDRAULIC SYSTEMS
Filed May 1, 1950      4 Sheets-Sheet 4
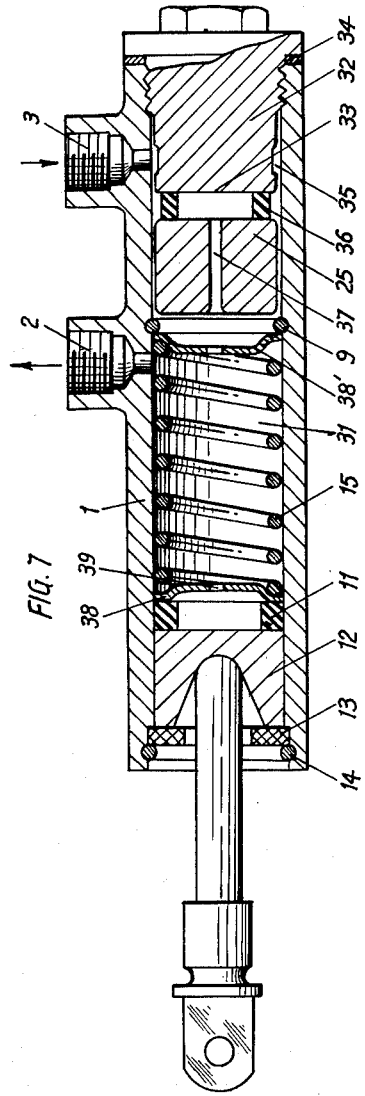
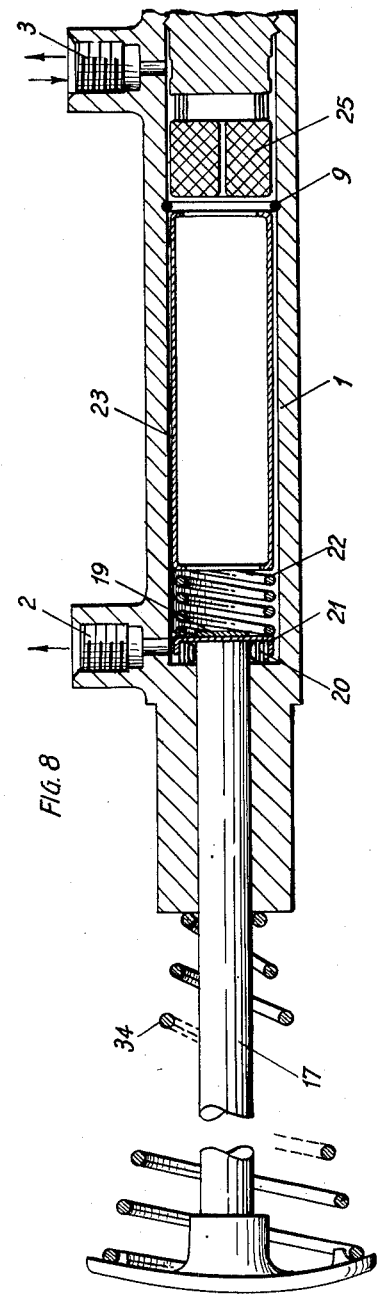
INVENTOR.
PHILIP S. BALDWIN
BY
ATTORNEY United States Patent Office 2,694,902
Patented Nov. 23, 1954

2,694,902

MASTER CYLINDER FOR HYDRAULIC SYSTEMS

Philip S. Baldwin, Florence, Italy, assignor of one-half to Fiat Società per Azioni, Turin, Italy Application May 1, 1950, Serial No. 159,225

Claims priority, application Italy May 4, 1949

15 Claims. (Cl. 60—54.6)

This invention relates to improvements in hydraulic pressure transmission systems, more particularly to improvements in the structure of master cylinders for said systems.

The object of this invention is to provide an improved valve arrangement to control communication between the master cylinder and reserve tank, which will permit of readily replenishing the system with fluid at all times and ensure free, unobstructed communication between the cylinder and reserve tank upon release of pressure.

Another main object is to provide a valve for said system which is freely floating and axially movable in the cylinder and is operated merely by hydraulic pressure.

Another object is to simplify structure of the master cylinder and lower production costs.

Minor improvements will be shown in the following description of the invention.

These improvements may be put into practice in various ways. The accompanying drawings show by way of example several forms of practical application of the invention to a hydraulic brake master cylinder.

In the drawing similar elements are indicated by the same numerals.

Fig. 1 is a longitudinal sectional view of a master cylinder with a valve constructed according to the present invention.

Fig. 2 is a longitudinal sectional view of the master cylinder with an improved valve according to the present invention.

Fig. 3 is a longitudinal sectional view of a master cylinder similar to that of Fig. 2 with a modified valve.

Fig. 4 is a longitudinal sectional view of a master cylinder similar to that of Fig. 1 with a modified valve.

Fig. 5 is a longitudinal sectional view of a master cylinder with a shaft plunger of smaller diameter working with an improved valve according to the invention.

Fig. 6 shows a detail of a stop-member.

Fig. 7 is a longitudinal view of a master cylinder with a simplified valve according to the invention.

Fig. 8 is a longitudinal sectional view of a master cylinder with a small diameter plunger operating in conjunction with the improved valve shown in Fig. 7.

The master cylinder shown in Fig. 1 is provided with a port 2 for connection with the wheel cylinders (not shown) and is connected to a reservoir (not shown) located above the master cylinder, through port 3.

The valve comprises the following parts: an elastic ring 4 of a diameter smaller than the cylinder bore and placed at the end of the cylinder, a metallic spacer 5 axially bored and having an outer annular channel 5" registering with the bore 3 and outer axial grooves, an elastic sealing ring 6 having a convex outer surface with a maximum diameter equal to or slightly greater than the cylinder bore and an annular thrust plate 7 with an axial bore 8. The spacer 5 is slightly spaced from the cylinder wall to permit passage of fluid around it.

The valve elements 4, 5, 6 and 7 are mounted axially movable at the end of the cylinder as shown and are initially completely spaced from one another. An annular spring element 9 in the form of a snap ring illustrated in detail in Fig. 6 is lodged in an annular groove 9' in the inner wall of the cylinder and serves as rear abutment for the valve elements. Said spring element is placed in the cylinder so that the floating elements 4, 5 and 6 of the valve are arranged with an axial play between them and are consequently free to move in the cylinder between its end and the said abutment.

At the opposite end of the cylinder the master piston comprises an annular thrust plate 10 similar to the thrust plate 7 of the valve, an elastic sealing ring 11 similar to the sealing ring 6 and a metallic piston element 12. A stop washer 13 and a spring clip 14 at the rear end of the cylinder limit the return stroke of the piston.

A spiral spring 15, inserted under compression in the cylinder, bears at one end against the annular stop member 9 and at the opposite end against the annular thrust plate 10. Said spring retracts the piston upon release of pressure.

The central bore 8 of the thrust plate 7 is of a sufficiently small diameter to choke the passage of the fluid from the cylinder compression chamber during the advancement of the master piston. In practice it has been found that in a master cylinder of 25.4 mm. diameter a suitable diameter for the bore is about 2 mm. With such a bore passage of fluid during pressure stroke is not greatly resisted, while the opposite flow of the fluid from the reservoir to fill the compression chamber is freely effected without creating an excessive underpressure in the system during the return stroke of the master cylinder.

In operation, when the master piston is advanced, fluid in the compression chamber 31 is forced through the bore 8 of the thrust plate 7 and said bore, owing to its small diameter, offers a resistance to the flow of fluid which is sufficient to bring the movable parts of the valve into axial contact with each other advancing them towards the end of the cylinder, to close them against passage of the fluid between them.

The fluid flows through the axial bores 6', 5', 4' of the valve elements, the port 2 and the connection pipes to the wheel cylinders (not shown). The pressure increase, on the fluid in the cylinder, exerted radially against the inner wall 4" of the elastic ring 4, causes a radial expansion of the same, bringing it to contact with the cylinder bore and so positively shutting off communication between the cylinder and the reserve tank.

The master cylinder is now operative to operate the brakes.

Upon release of pressure the valve ring 4 contracts, the valve elements become disengaged axially and communication with the reservoir is reestablished.

From the foregoing, it is obvious that the valve operates to close and open communication with the reserve tank merely by hydraulic means and is not dependent on mechanical means to accomplish this.

The initial bleeding of the system is accomplished in the normal manner from the bleeder vents located on the four wheel cylinders (not shown).

With each protractile stroke of the master cylinder liquid and air are expelled from the compression chamber through the port 8, axial bores 6', 5', 4' of the valve elements, and from the front port of the cylinder 2. With each rectractile stroke, the axially movable elements of the valve are sucked backwards and the fluid is quickly drawn from the reservoir into the compression chamber. By quickly operating the master piston, air in the compression chamber is mixed with the fluid and is expelled with it from the bleeder vents of the wheel cylinders, until it is completely eliminated from the system. The bleeder vents are successively closed and the brakes may operate.

The master cylinder of Fig. 2 shows a modification of the valve according to the invention. The relative positions of the two elastic rings 4—4 are reversed with respect to that of Fig. 1 and a thrust tumbler 16, having at its end an axial bore of a reduced diameter, is substituted for the thrust plate 7. The elastic sealing ring 6 is placed at the end of the master cylinder and the elastic ring 4 of a reduced diameter is placed between the spacer 5 and tumbler 16.

Similarly to the embodiment shown in Fig. 1, the valve elements 4, 5, 6 and 16 are freely movable between the end of the cylinder and abutment element 9 with a small axial play.

The master piston is similar to that shown in Fig. 1 and operates in the same manner. The modified valve operates susbtantially in the same manner as the valve shown in Fig. 1, but in the present arrangement air can be expelled from the compression chamber 31 directly into the reservoir around the periphery of the valve elements 16, 4 and 5; consequently, air may be eliminated from the master cylinder without using the bleeder vents in the wheel cylinders.

This is possible in view of the fact that the air, owing to its great compressibility and slight viscosity, can be freely expelled under pressure around the periphery of the tumbler 16 during the pressure stroke of the master piston, while the fluid, owing to its higher viscosity and incompressibility, offers a higher resistance to the flow of fluid, which causes a relative increase in hydraulic pressure in the system.

Said pressure acts perpendicularly to the inner wall of the ring 4, causing expansion of same against the bore of cylinder 1, so as to close communication with the reservoir (not shown) as previously explained.

Fig. 3 shows a further modification of the valve according to the present invention. A weak spiral spring 26 is inserted, exerting a constant stress, of approximately 200 gr., between the base of the tumbler 16 and thrust plate 27 which abuts the abutment 9. The said spring serves to compress axially the movable parts of the valve and to hold them constantly in slight pressure contact with each other and against the end of the cylinder, said action combining with the hydraulic pressure exerted on the base of the tumbler 16 during the protractile stroke of the master cylinder. The spring 16 affords an improved reliability in axial closure of the valve.

In the embodiment shown in Fig. 4, wherein the valve element is similar to that shown in Fig. 1, a spiral spring 28 is freely mounted between the bottoms of the cup members 29 and 30, which serve as thrust members for the valve, and the master piston, respectively, said thrust members being similar and interchangeable.

The spring 28 is held in place by the said cups and its free length is slightly shorter (0.5 mm. approximately) than the inner distance between the bottoms of said cups, when the master piston is fully retracted. As a consequence, the valve elements are axially spaced from one another when in an inoperative position, the spring not being initially subjected to axial compression.

On advancement of the master piston, the spring 28 is compressed and exerts an axial pressure on the valve elements, pressing them against each other and against the end of the cylinder, this action combining with the hydraulic pressure exerted on the thrust cup 29, the resultant force being directed along the cylinder axis.

In said embodiment, while under normal inoperative condition the elements 4', 5', 6', forming the valve, are spaced from one another and are axially movable, said elements are pressed against each other and against the adjacent end wall of the cylinder by hydraulic pressure and the mechanical pressure of spring 28 under operating conditions, thereby increasing the sensitivity of the valve to the cut-off.

The master cylinder shown in the embodiment of Fig. 5 has a plunger shaft 17 of a smaller diameter than the cylinder bore. At the rear end of said shaft protruding back of the cylinder, the pedal 18 is attached. With this arrangement the usual brake pedal levers are dispensed with.

The plunger shaft diameter and that of the bore of the wheel cylinders are so proportioned as to give an equivalent pressure ratio as with the normal brake pedal leverage. Thus, if the diameter of the plunger is 12 mm. and that of the wheel cylinders is 25.4 mm., the pressure ratio will be about 1 to 4.5.

The said arrangement, besides eliminating the pedal leverage also permits a rough finish of the cylinder nearly over its full length. Only the forward part of the cylinder, wherein the valve elements slide, and the rear guide bore of the shaft shall be machined to a smooth finish. This permits an important lowering of the production cost.

As shown in the drawing, the cylinder is longitudinally bored at 17' in its rear wall, the bore serving as a rear guide for the shaft plunger sliding therein. The fore end of the plunger protruding into the compression chamber has an enlarged annular head 19 which serves as a stop means for the plunger when it is completely retracted. Between the head 19 and rear end of the cylinder an elastic sealing ring 20 is freely mounted on the shaft and has an inner convex periphery and a metallic thrust ring 21 which engages the forward face of the said elastic sealing ring.

As illustrated, the annular head 19 abuts the thrust ring 21 when the plunger is completely retracted. A spiral spring 22, inserted in the cylinder under compression, abuts at one end the thrust ring 21 and at its other end the spacer tube 23 which is placed in the cylinder and abuts the stop ring 9. Spring 22 serves to keep the elastic sealing ring 20 in constant engagement with the rear inner face of the cylinder, thereby avoiding any escape of fluid along the shaft plunger.

The return spring 24 bearing under pressure at one end against the outer rear cylinder face and at the other end against the inner face of the pedal 18, serves to retract the plunger upon release of pressure.

In the present embodiment of shaft plunger master cylinder the valve illustrated in Fig. 2 is normally used. However, the tumbler 16 is substituted for by an axially bored valve piston 25, acting in the same manner as the tumbler 16.

In operation, when the plunger is advanced into the compression chamber 31, the hydraulic pressure exerted on the thrust plate 21 presses the elastic ring against the rear wall of the cylinder.

The hydraulic pressure acts perpendicularly to the outer face of the elastic ring 20 pressing it against the shaft 17 and ensuring in this manner a seal along said shaft. Said seal is ensured even if, when no pressure is exerted on the elastic ring, the latter is mounted with a slight clearance on the shaft 17.

It is evident that operation of the valve at the end of the cylinder during the reciprocating movements of the shaft plunger is similar to the operation of the valve illustrated in Fig. 2.

In the master cylinder having a shaft plunger the feed port 2 communicating with the outer hydraulic circuit may be placed in the rear upper part of the cylinder in order to improve bleeding of air.

It is to be noted that the rings 20, 21 are not confined radially by the cylinder walls, but are completely free from them.

Fig. 7 illustrates a modification of the master cylinder having a valve of simplified form which affords an important lowering of production cost.

A metallic plug element 32 with a spacer head 33 screws into the fore end of cylinder 1 against the washer 34 and forms a tightly sealed base for the cylinder. An annular channel 35 cut in the periphery of head 33 registers with port 3 and serves to establish communication between the cylinder and reservoir.

The valve comprises the spacer head 33, an elastic ring 36, of smaller diameter than the cylinder bore, and a metallic piston element 25 with normal sliding fit in the cylinder and an axial bore of small diameter 37.

The valve elements 36 and 25 are loosely mounted in the cylinder between the head 33 and a stop ring 9 fitted in an annular slot cut in the cylinder bore as shown, with slight axial play between them, and are unattached to one another.

At the opposite end of the cylinder, the master piston comprises the thrust plate 38 with central port 39, an elastic sealing ring 11, and a metallic piston element 12 somewhat similar to that illustrated in Fig. 1.

A spiral spring 15, inserted under initial compression in the cylinder, abuts at one end against the thrust plate 38 and at its opposite end against the thrust plate 38', bearing on the stop ring 9. These thrust plates are identical and are flanged as shown with the collars of the flanges serving as supports for the spring 15.

The axial bore 37 of valve piston 25 is of sufficiently small diameter to choke the passage of fluid from the cylinder compression chamber 31 to the inner periphery of ring 36 with the advance of the master piston. In practice it has been found that in a cylinder of 25.4 mm. diameter, a suitable diameter for the bore 37 is about 1.5 mm. With such a bore, passage of fluid under pressure is resisted sufficiently to cause valve elements 25 and 36 to move forward into axial contact with each other and close communication between the inner radial periphery of ring 36 and the reservoir around head 33 and through port 3.

In operation, when the master piston is advanced, fluid in the compression chamber is forced through valve piston bore 37, to bring valve elements 25, 36, 33 into axial contact. Fluid flows through port 2 and connecting pipe lines to the wheel cylinders. The increased pressure takes effect on the inner surface of valve ring 36 which is expanded radially against the cylinder bore to positively shut off communication between the cylinder and the reservoir. The master cylinder is now operative to deliver hydraulic pressure to the wheel cylinders and operate the brakes.

Upon release of pressure, the master piston is retracted by spring 15, the valve ring 36 contracts, valve elements 25 and 36 become disengaged axially, and communication with the reservoir is reestablished around head 33 and through port 3.

The initial bleeding of the system of air is accomplished in the normal manner from the bleeder vents located at the four wheel cylinders.

The master cylinder of Fig. 8 has a shaft plunger 17 mounted in the cylinder in a manner fully similar to that illustrated in Fig. 5. The valve system is similar to that illustrated in Fig. 7.

The valve arrangement shown in Figs. 7 and 8 affords the advantage of a greater simplicity, owing to the small number of parts necessary for the operation of the valve. This advantage ensures a lowering in the production cost of the master cylinder.

It is important to note that in the arrangements shown in Figs. 5, 7, 8 the fluid delivery ports for the wheel cylinder are placed ahead of the valve controlling communication between the master cylinder and reservoir. This is very important in view of the fact that the fluid delivered to the wheel cylinders must not overcome the resistance in the passage through the valve. As a consequence it is possible to increase the sensitivity of the valve by reducing the diameter of the bore connecting the compression chamber with the inner surface of the elastic sealing ring 4, 36.

Owing to the fact that in the described arrangements the valves float freely and are axially movable and hydraulically actuated, they can always open and shut off communication between the circuit and reserve tank, whatever the position of the piston or plunger in the master cylinder may be. Consequently, while it is not possible to create an underpressure in the system during the return stroke of the piston or plunger, it is constantly possible to quickly fill the system with fluid and to exert an hydraulic pressure during the advancement stroke of the piston, whatever may be the starting position of said piston or plunger. In other words the valve starts working with the same sensitivity whatever may be the point of the stroke from which the movement of the piston or plunger starts.

It is to be understood that the various constructions and arrangements of the parts as illustrated and described are submitted as practical embodiments of the working principles involved, and may be modified as to details without departing from the spirit of the invention.

What I claim is:

1. A master cylinder for hydraulic pressure transmission systems comprising a cylinder body having a compression chamber and an inlet port communicating with a source of fluid; an outlet port; a piston reciprocable in the cylinder and an elastic valve ring freely mounted and axially floating in said cylinder, said valve ring lying adjacent said inlet port and being responsive to movements of the piston for controlling communication between the cylinder and inlet port, stop means in the cylinder adjacent the inlet port to limit axial movement of the valve ring, said valve ring being actuated by hydraulic pressure to close communication with the inlet port when the piston is advanced and to open said communication when the piston is retracted.

2. A master cylinder for hydraulic pressure transmission systems comprising a cylinder body having an inlet port communicating with a source of fluid; an outlet port; a piston reciprocable in the cylinder and means therein to return the piston to its starting position, an elastic ring freely mounted and axially floating in said cylinder, said valve ring lying adjacent said inlet port and being responsive to the movements of the piston for controlling the flow of fluid between said cylinder and inlet port, stop means in the cylinder at one end of said return means to limit axial movement of the valve ring, said stop means serving as an abutment for the piston return means, said valve ring being actuated by hydraulic pressure to close communication between the cylinder and the inlet port when the piston is advanced, and to open said communication when the piston is retracted.

3. A master cylinder for hydraulic pressure transmission systems as claimed in claim 2, in which the stop means for the freely mounted valve ring comprises an element rigidly fixed in the cylinder at the valved end of the cylinder, between the inlet port and the piston.

4. A master cylinder for hydraulic pressure transmission systems having inlet and outlet ports, a piston at one end of said cylinder and a valve at the other end thereof, said valve lying adjacent said inlet port and being freely movable axially in said cylinder to control the flow of hydraulic fluid to and from said inlet port in response to the movements of said piston in the cylinder, stop means within the cylinder between the valve and piston, compressible means between said stop means and said piston to maintain said piston in retracted position, said stop means limiting the axial movement of said valve with respect to said inlet port and forming an abutment for said compressible means, whereby on the protractile stroke of the piston the valve is subjected only to the hydraulic pressure exerted thereon.

5. A master cylinder for hydraulic pressure transmission systems, having inlet and outlet ports, the inlet port communicating with a source of fluid, a freely mounted elastic valve ring axially floating in the cylinder lying adjacent the inlet port for controlling communication between the port and cylinder; a piston at the end of the cylinder opposite said valve ring and reciprocable therein; a stop member in the cylinder between the valve ring and piston limiting axial movement of the valve ring, means positioned between the stop member and piston for returning the latter to its starting position after a compression stroke, a packing means for the piston, a thrust plate seated on the piston packing and a thrust plate resting against the valve ring, yieldable means extending between said plates and supported thereby, said last named means exerting pressure on the piston packing and valve ring only when the piston is moved on a compression stroke.

6. A master cylinder for hydraulic pressure transmission systems having an inlet port for communication with a source of fluid, and an outlet port, a piston within the cylinder substantially smaller in diameter than the cylinder bore, an axially floating, freely mounted elastic valve ring in the cylinder opposite the piston, and controlling the flow of fluid to and from the inlet port in response to the movements of the piston in the cylinder, the outlet port lying at the piston end of the cylinder; a stop means in the cylinder between said ports limiting axial movement of the valve ring, a sleeve within said cylinder forming a compression chamber therein and abutting said stop means, said piston being reciprocable within said sleeve, the fluid in the cylinder flowing freely around said piston to the outlet port on the compression stroke of the piston.

7. A master cylinder for hydraulic pressure transmission systems having an inlet port for connection with a source of fluid, and an outlet port; a shaft extending through said cylinder and reciprocating therein, the forward portion of said shaft forming a piston in the cylinder, a packing between said piston and cylinder, said piston being of uniform diameter, said diameter being substantially smaller than that of the cylinder bore, a freely mounted and axially floating elastic valve ring in the cylinder opposite said piston and controlling the flow of the fluid to and from the inlet port in response to the movements of said piston portion in the cylinder, the outlet port lying at the piston end of the cylinder; a stop means in the cylinder between said ports limiting axial movement of the valve ring; means in the cylinder for maintaining the piston packing under initial compression, the fluid in the cylinder flowing around said piston to the outlet port on the protractile stroke of the piston.

8. A master cylinder for hydraulic pressure transmission systems having a piston closing one end thereof and a plug closing the other end thereof, the inner end of the plug having a periphery spaced from the cylinder wall, an inlet port in the wall of the cylinder adjacent said spaced portion of the plug connecting said cylinder with a source of fluid, a freely mounted axially floating valve ring adjacent the plug for controlling the flow of fluid to and from said inlet port in response to the reciprocal movements of the piston in the cylinder, stop means in the cylinder limiting axial movement of said valve ring, an outlet port in the cylinder wall between the stop means and the piston, said valve ring lying between said inlet and outlet ports, the initial protractile stroke of the piston causing the valve to close by hydraulic means the communication between the cylinder and the inlet port, and thereafter causing the fluid in the cylinder to flow freely through the outlet port.

9. A master cylinder for hydraulic systems comprising a cylinder body having an inlet port communicating with a source of fluid; an outlet port; a piston reciprocable in the cylinder and a valve freely floating and axially movable therein opposite said piston, said valve comprising an elastic ring lying adjacent said inlet port and being expansible and contractible with respect to the cylinder wall in response to the movements of the piston for controlling communication between said cylinder and inlet port; stop means fixed in the cylinder between the piston and valve to limit axial movement of said valve to the vicinity of said inlet port, said valve being subjected to hydraulic pressure when the piston is advanced on a compression stroke.

10. A master cylinder for hydraulic pressure transmission systems comprising a cylinder body having an inlet port communicating with a source of fluid; an outlet port and a compression chamber, a piston reciprocable in the cylinder and a valve element comprising an elastic ring with inner and outer periphery freely mounted and axially floating in the cylinder, lying adjacent said inlet port and being responsive to movements of the piston for controlling the flow of liquid between the inlet port and the cylinder, means for spacing the ring from said port, stop means in the cylinder adjacent the ring to limit axial movement of the ring, the ring being moved towards the inlet port spacer means to close communication between the cylinder and the inlet port when the piston is protracted, and towards the stop means when the piston is retracted to open said communication, the inner periphery of the ring being mechanically unsupported radially and being always in open communication with the fluid in the cylinder.

11. A master cylinder for hydraulic pressure transmission systems comprising a cylinder body having a compression chamber, an inlet port communicating with a source of fluid and an outlet port, a piston reciprocable in the cylinder and yielding return means for the piston, an elastic ring having an inner and outer periphery, freely mounted and axially floating in the cylinder, said ring being adjacent said inlet port and responsive to the movements of the piston for controlling communication between said cylinder and inlet port, stop means in the cylinder to limit axial movement of the ring, and serving as an abutment for the piston return means, means for spacing the ring from the inlet port, said ring being actuated by hydraulic means to close communication with the inlet port when the piston is advanced and to open said communication when the piston is retracted, the ring moving towards the inlet port spacer means on the piston protractile stroke, and towards the stop means with the retractile stroke of the piston, the inner periphery of the ring being mechanically unsupported and always in open communication with the fluid in the cylinder.

12. A master cylinder for hydraulic pressure transmission systems comprising a cylinder body having an outlet port, a piston reciprocable in the cylinder, an inlet port communicating with a source of fluid near the end of the cylinder bore opposite the reciprocable piston, an elastic valve ring freely mounted and axially floating in the cylinder, said valve ring lying adjacent said inlet port, stop means in the cylinder to limit axial movement of the valve ring, said valve ring being actuated by hydraulic pressure to close communication with the inlet port when the piston is advanced and to open said communication when the piston is retracted.

13. A master cylinder for hydraulic pressure transmission systems comprising a cylinder body having an outlet port, a piston reciprocable in the cylinder, an inlet port communicating with a source of fluid near the end of the cylinder bore opposite the reciprocable piston, an elastic ring freely mounted and axially floating in the cylinder, said valve ring lying adjacent said inlet port and controlling communication between the cylinder and inlet port, the bore of the cylinder having an annular groove, a spring clip fitted in said annular groove to limit axial movement of the valve ring, said valve ring being actuated by hydraulic pressure to close communication with the inlet port when the piston is advanced and to open said communication when the piston is retracted.

14. A master cylinder for hydraulic pressure transmission systems comprising a cylinder body having an outlet port, a piston reciprocable in the cylinder and yielding return means for the piston, an inlet port communicating with a source of fluid near the end of the cylinder bore opposite the reciprocable piston, an elastic valve ring freely mounted and axially floating in the cylinder, said valve ring lying adjacent said inlet port and controlling communication between the cylinder and inlet port, the bore of the cylinder having an annular groove and a spring clip fitted in the groove to limit axial movement of the valve ring and to serve as an abutment for the piston return means, said valve ring being actuated by hydraulic means to close communication with the inlet port when the piston is advanced and to open said communication when the piston is retracted.

15. A master cylinder for hydraulic pressure transmission systems as claimed in claim 1 in which a yieldable means is inserted in the cylinder between the valve ring and stop means to urge the ring towards the inlet port.

References Cited in the file of this patent

UNITED STATES PATENTS

| Number | Name | Date |
|---|---|---|
| 1,550,089 | Mattingly | Aug. 18, 1925 |
| 1,593,188 | Mattingly | July 20, 1926 |
| 2,136,835 | Begg | Nov. 15, 1938 |
| 2,326,116 | Baldwin | Aug. 10, 1943 |
| 2,444,181 | Baldwin | June 29, 1948 |

FOREIGN PATENTS

| Number | Country | Date |
|---|---|---|
| 661,547 | Germany | June 21, 1938 |